United States Patent [19]
Sugiura

[11] Patent Number: 5,598,897
[45] Date of Patent: Feb. 4, 1997

[54] POWER STEERING DEVICE

[75] Inventor: Akehito Sugiura, Hekinan, Japan

[73] Assignee: Chuouhatsujou Kabushiki Kaisha, Tokyo, Japan

[21] Appl. No.: 473,749

[22] Filed: Jun. 7, 1995

[30] Foreign Application Priority Data

Jun. 21, 1994 [JP] Japan .................................. 6-163216

[51] Int. Cl.$^6$ .............................. B62D 5/083; B62D 5/09; B62D 5/30
[52] U.S. Cl. .......................... 180/417; 91/383; 180/428; 180/429; 180/430
[58] Field of Search ..................... 180/132, 137, 180/145, 146, 147, 148, 149, 154, 79.3, DIG. 7; 280/777; 91/375 R, 383; 137/625.21

[56] References Cited

U.S. PATENT DOCUMENTS 5,018,469  5/1991  Carlson ............................. 180/147 X
5,266,060  11/1993  Onoue ............................... 180/132 X

FOREIGN PATENT DOCUMENTS 49-11432  1/1974  Japan .

Primary Examiner—Eric D. Culbreth
Assistant Examiner—F. Zeender
Attorney, Agent, or Firm—Emmanuel J. Lobato; Burns & Lobato, P.C.

[57] ABSTRACT

A power steering device for automobile type vehicles having a hydraulic power cylinder for assisting in steering front end wheels of the vehicle. The hydraulic power cylinder has a piston and piston rod fixed thereto reciprocable in two opposite directions of travel. The opposite ends of the piston rod are linked to respective front wheels of the vehicle for turning the individual steering wheels in a direction in which the piston rod travels. The piston rod has a rack with which a pinion is engaged and rotated by a shaft rotated by a drum coupled to the shaft for effecting manual steering. Another drum is provided and is rotated by the steering wheel by the vehicle driver. The drums are operationally coupled by a pair of flexible cables for rotating the drums by the steering wheel to move the piston rod rack in the desired steering direction. A direction control valve having a rotatable rotor is coupled to the drum which drives the rack pinion. The control valve rotor controls supply of pressurized hydraulic fluid from a pressurized source alternately on opposite sides of the piston for assisting driving the piston rod axially in the desired direction of travel for steering the vehicle and simultaneously controls the discharge of fluid from the power cylinder through ports on the hydraulic power cylinder in communication with ports on the direction control valve under control of the rotatable rotor and in dependence upon the direction of rotation of the control valve rotor from the steering wheel and the operatively associated two drums.

5 Claims, 3 Drawing Sheets

POWER STEERING DEVICE

BACKGROUND OF THE INVENTION

1. Field of the Invention

The present invention relates to a power steering device for car utilizing a pair of control cables to be put under a tensile force and a power cylinder.

2. Description of the Prior Art

A shaft has generally been employed as means serving to transmit a rotational motion of the steering wheel to the steering mechanism and recently use of a flexible control cable has been examined in view of its various advantages such that a high degree of freedom is available for location as well as angle at which the steering wheel is mounted, a wide space is obtained around a driver's feet, the control cables can be selectively laid within the engine room and the cable replacing the shaft contributes to the desired weight reduction.

The control cable can be selected from those of various types and it is preferred to use a pair of pull-cables adapted to be subjected only to a pulling force in view of disadvantages encountered by the cables of other types such that so-called push/pull-cable can not be free from an undesirable play generated on its pushing side which may cause a transmission delay and an error, the geared cable having a single wire spirally wound therearound and serving as engaging teeth requires an extremely high precision with which the single wire is wound around the cable in order to avoid the play and consequently requires unacceptably high manufacturing cost and rotary cable also can not be free from the transmission delay and the error due to its insufficient torsional rigidity.

The steering device using said pull-cable is described in Japanese Utility Model Application Disclosure Gazette No. 1974-11432. However, this steering device of prior art comprises a bobbin coupled to a steering wheel, a disc coupled to tie rods on either side and a pair of pull-cables connecting said bobbin to said disc which must be placed halfway between said tie rods on opposite sides. Accordingly, no freedom is available for design and it is difficult for such steering device to be placed in a restricted space.

SUMMARY OF THE INVENTION

To solve the problems as have been mentioned above, the invention provides a power steering device for car comprising a power cylinder containing therein a piston rod having its opposite ends coupled to front wheels by means of a steering link mechanism, a rotary control valve serving for direction-control of operating fluid to be supplied to said power cylinder and simultaneously discharged from said power cylinder, a drum operatively associated with said valve and coupled to a rotor of said control valve, another drum operatively associated with and coupled to steering wheel, and a pair of control cables consisting of flexible outer tubes and inner cables slidably guided within the respective outer tubes and wound on the respective drums so that these inner cables are alternately put under a tensile force as said drum operatively associated with the steering wheel is rotated in alternate directions, wherein rotation of the steering wheel in one direction causes the drum operatively associated with the steering wheel to be rotated and thereby to take up the inner cable associated with one of the control cable. Thereupon a tensile force is exerted on this inner cable so as to rotate the drum operatively associated with the valve in one direction and thereby the rotor of the control valve is rotated. As a result, operating fluid is supplied to one side of the power cylinder and discharged from the other side of the power cylinder so as to move the piston rod in one direction and thereby to steer the front wheels to one direction. In the similar manner, rotation of the steering wheel in the other direction causes the front wheels to be steered to the other direction. The front wheels are actually steered by the power cylinder and therefore a relatively small force is sufficient to rotate the steering wheel. Diameters of the drums and the inner cables can be dimensioned to be correspondingly reduced and the axis of the rotor for the control valve can be selectively oriented since the drum operatively associated with the valve is connected with the flexible control cables. In this manner, a high degree of freedom for design is obtained.

DESCRIPTION OF THE PREFERRED EMBODIMENT

Figure 1:
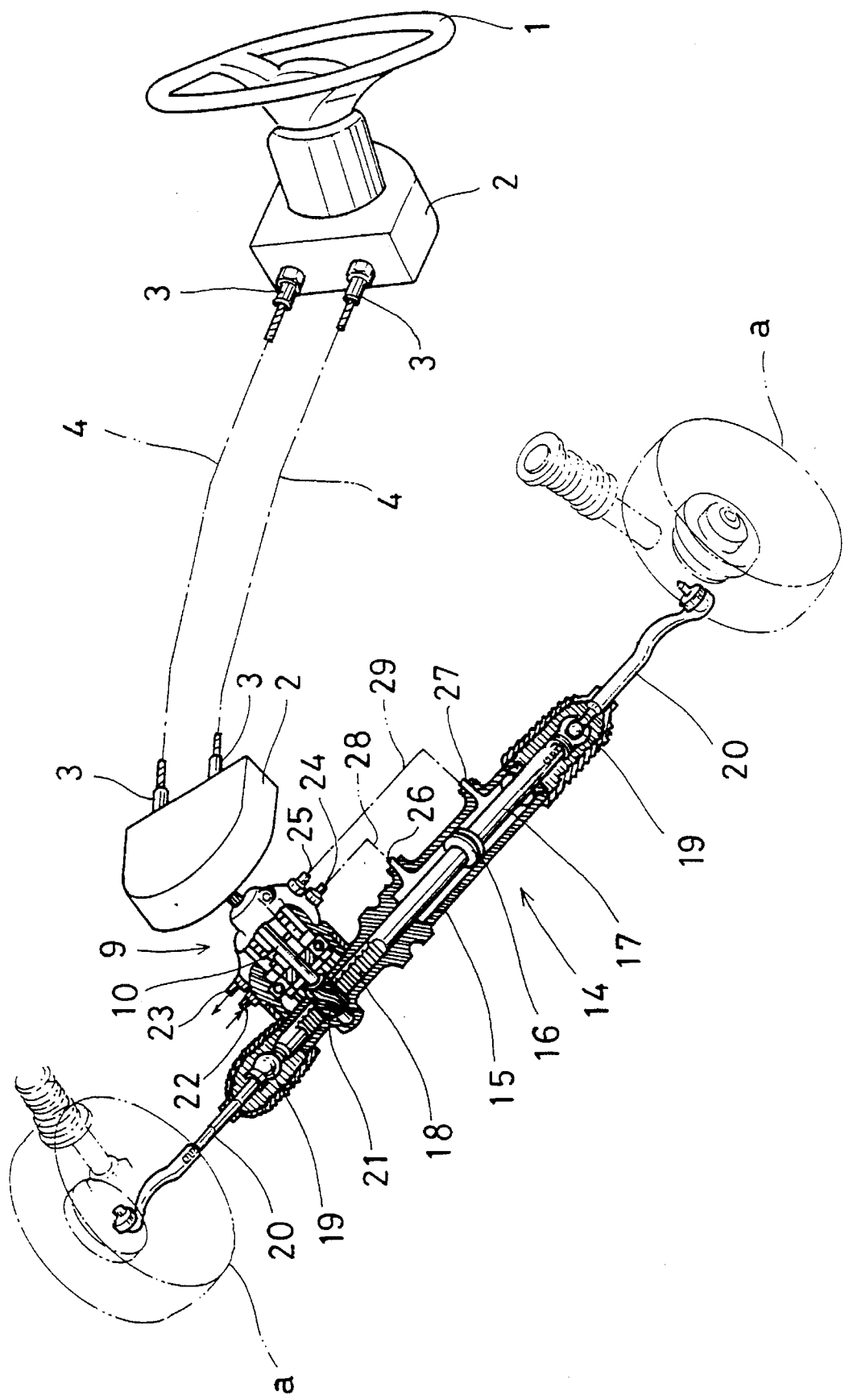
FIG. 1 is a perspective view showing an embodiment of the invention as partially broken away.
Figure 2:
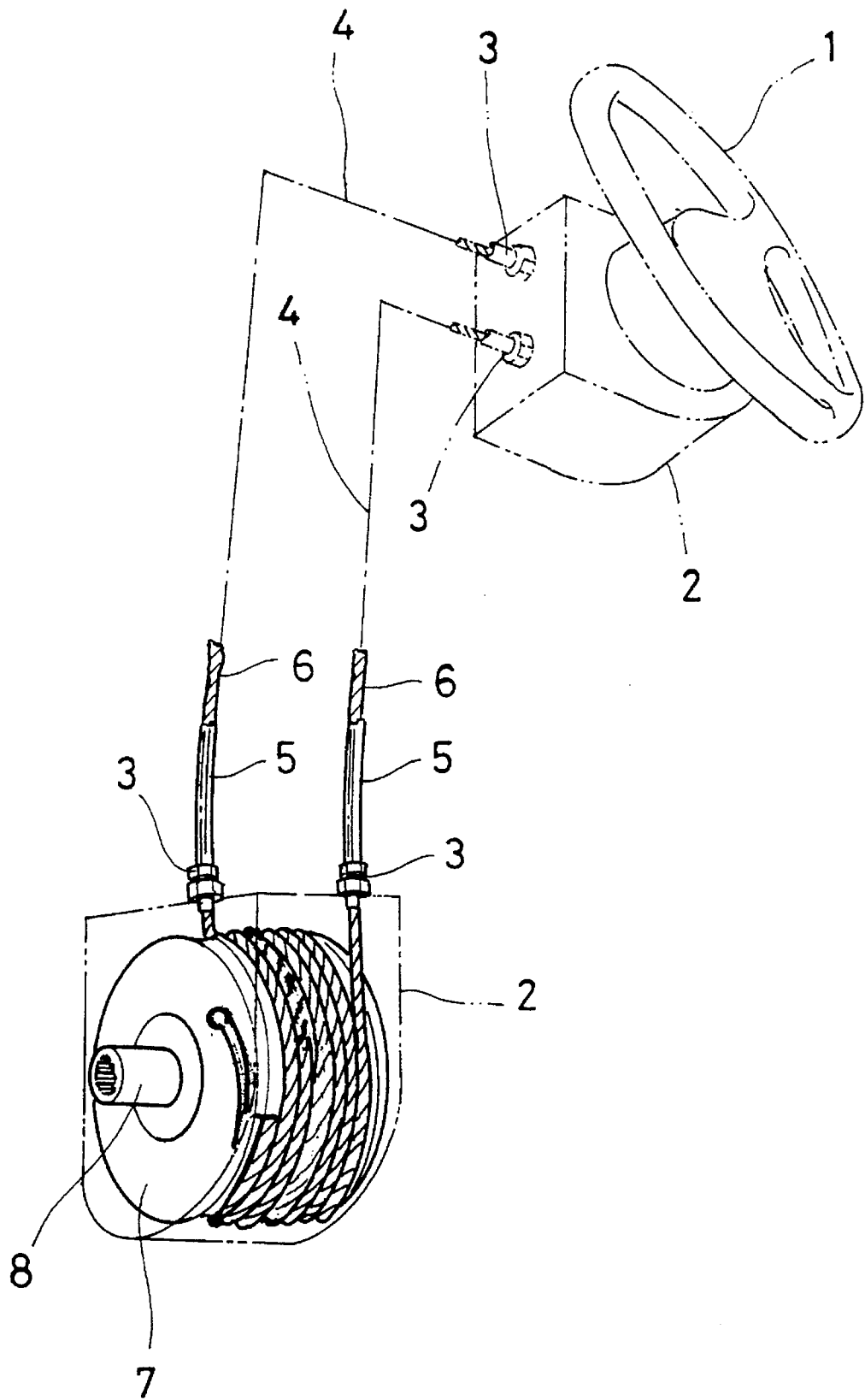
FIG. 2 is a perspective view showing a drum used in the embodiment of the invention.

Details of the invention will be more readily understood from the following description of a presently preferred embodiment made in reference with the accompanying drawings.

Referring to the accompanying drawings, reference numeral 1 designates a steering wheel rotatably supported by a casing 2 mounted on a car body.

A steering linkage occupying a front of the car body is provided with another casing 2 configured identically to the first-mentioned casing 2 and a pair of control cables 4 extend between these two casings 2, 2 with respective ends of these control cables 2, 2 being fixed to the casings 2, 2 by means of cylindrical fasteners 3.

Figure 3:
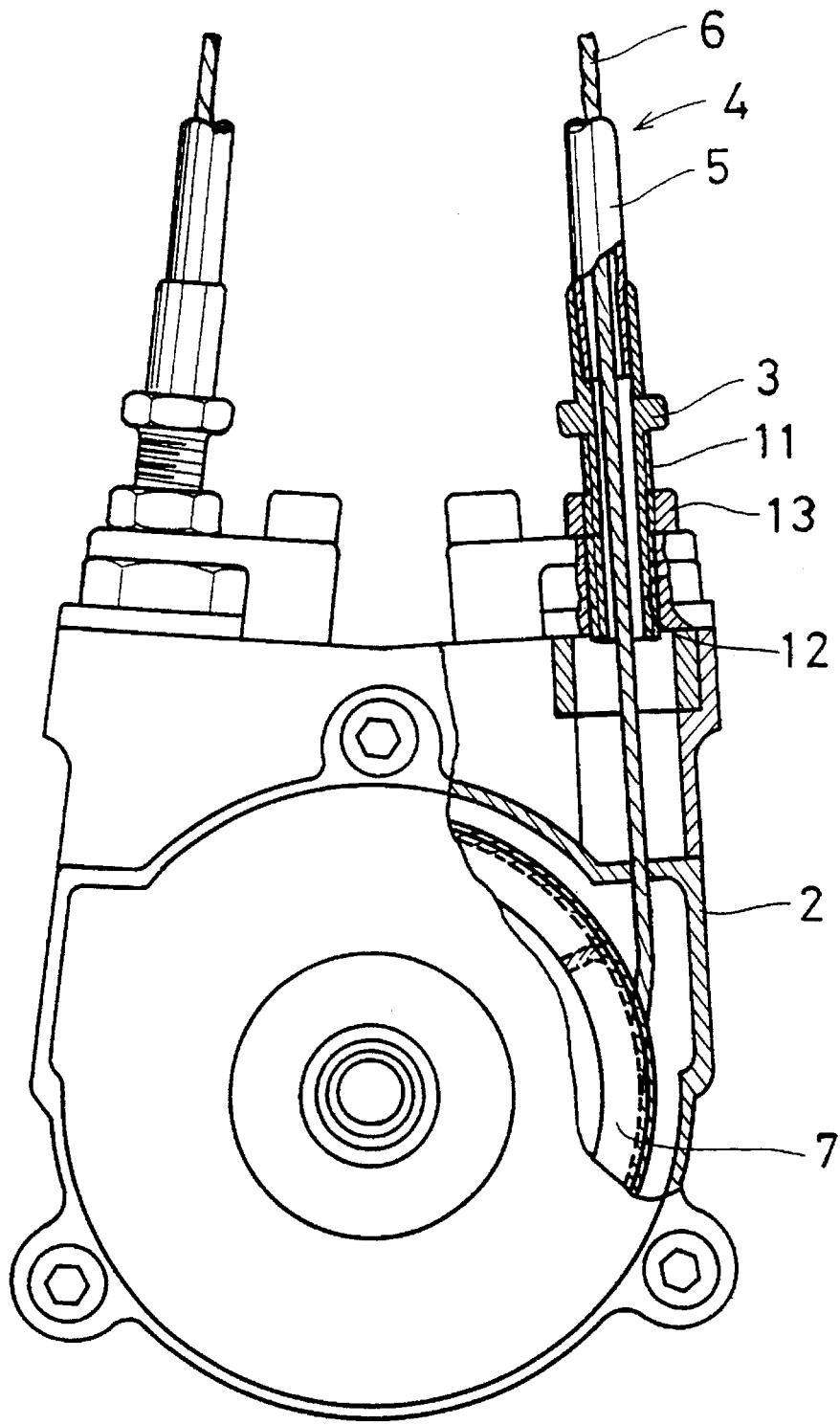
FIG. 3 is a front view showing, as partially broken away, a length adjuster mechanism for the control cables laid between the drums in the embodiment of the invention.

Each of the control cables 4 comprises an outer tube 5 and an inner cable 6 slidably guided within said outer tube 5. As will be apparent from FIG. 3, the cylindrical fasteners 3 are mounted on the opposite ends of the outer tube 5 with caulking and male threads 11 formed therearound are engaged with corresponding female threads 12 formed in the casings 2, 2 so that the cylindrical fasteners 3 may be rotated to adjust the length of the control cables extending between the casings 2, 2 and then fixed at this length by nuts 13. The inner cables 6 have their opposite ends fixed to drums 7 rotatably supported within the respective casings 2, 2 and are wound in directions opposite to each other on said drums 7.

A rotary shaft 8 of each drum 7 projects outward from one side of the associated casing 2. Adjacent the steering wheel 1, said rotary shaft 8 is coupled to a rotary shaft of the steering wheel 1 and adjacent the steering linkage, said rotary shaft 8 is coupled to a rotor 10 of a rotary valve 9 as will be described later.

Reference numeral 14 designates a power cylinder comprising a cylinder tube 15 and a piston 16 slidably guided within said cylinder tube 15. A piston rod 17 is fixed to the piston 16 and extends on both sides therefrom and an extension of the piston rod 17 on one side defines a rack 18.

Opposite ends of the piston rod 17 are linked by ball joints 19 to tie rods 20 which are, in turn, linked by knuckle arms (not shown) to front wheels a.

It should be understood that an assembly comprising the tie rods 20, the knuckle arms etc. will be hereinafter referred to as a steering link mechanism.

The rotor 10 of the rotary valve 9 stationarily carries a pinion 21 adapted to be engaged with the rack 18.

The rotary valve 9 has an inlet port 22 connected to a hydraulic pump (not shown) and an outlet port 23 connected to a reservoir (not shown). The rotary valve 9 has, in addition to said inlet and outlet 22, 23, two ports 24, 25 connected by pipes 28, 29 to two ports 26, 27 of the cylinder tube 15 so that operating fluid may be supplied to one side and discharged from the side of the piston 16 as the rotor 10 is rotated in one direction and supplied to said other side and discharged from said one side of the piston 16 as the rotor 10 is rotated in the other direction so as to move the piston 16 together with the piston rod 17.

This embodiment operates as follows:

Rotation of the steering wheel 1 in one direction causes one of the inner cables 6 associated with the respective control cables 4 and wound on the drum 7 operatively associated with the steering wheel 1 and on the drum 7 operatively associated with the steering linkage, respectively, to be taken up by the drum 7 operatively associated with the steering wheel 1 to generate a tensile force under which the inner cable 6 is let out from the drum 7 operatively associated with the steering linkage and thereby causes this drum 7 to be rotated together with its rotary shaft 8 in one direction. At the same time, the inner cable 6 associated with the other control cable 4 is let out from the drum 7 operatively associated with the steering wheel 1 and taken up by the drum 7 operatively associated with the steering linkage.

In the similar manner, rotation of the steering wheel 1 in the other direction causes the drum 7 operatively associated with the steering linkage to be rotated together with its rotary shaft 8 in the other direction.

As the rotary shaft 8 of the drum 7 operatively associated with the steering linkage is rotated in one direction, the rotor 10 coupled to this rotary shaft 8 is rotated in the same direction. This rotation of the rotor 10 tends to move the piston rod 17 in one direction through engagement of the pinion 21 with the rack 18. Rotation of the rotor 10 simultaneously causes operative fluid to be supplied from one of the ports 24, 25 of the rotary valve 9 to one of the ports 26, 27 of the power cylinder 14, assisting said movement of the piston rod 17. Consequently, the front wheels a are steered to one direction via the steering link mechanism.

In the similar manner, rotation of the rotary shaft 8 of the drum 7 operatively associated with the steering linkage in the other direction causes the front wheels a to be steered to the other direction.

According to this embodiment, the cylindrical fasteners 3 may be rotated to adjust the length of the control cables 4 extending between those two casings 2, 2, so a possible play of the inner cables 6 can be reduced and thereby a delay as well as an error in transmission can be reduced.

The inner cables 6 are preferably swaged for further reducing said play, transmission delay and error. This swaging is advantageous also to obtain the inner cables having smooth surfaces and thereby to reduce a sliding resistance of each inner cable relative the associated outer tube. For example, when the inner cable having an initial diameter of 4 mm is swaged to obtain the inner cable having a diameter of 3.5 mm, an elongation of this swaged inner cable is reduced to approximately 60% of that occurring in the not swaged inner cable.

I claim:

1. A power steering device comprising:

a hydraulic power cylinder having a piston and piston rod thereof reciprocably driven by pressurized hydraulic fluid supplied to the power cylinder alternately on opposite sides of the piston while hydraulic fluid is simultaneously discharged from the power cylinder from a side of the piston opposite to the side to which pressurized hydraulic fluid is being supplied, said hydraulic power cylinder having a pair of ports for alternately supplying the pressurized hydraulic fluid through one of the ports while discharging hydraulic fluid through the other of said ports for reciprocating the piston rod thereof alternately in opposite directions of travel, a rotary direction control valve having ports in communication with said hydraulic power cylinder ports and having other ports for communication with a source of pressurized hydraulic fluid for receiving pressurized hydraulic fluid therefrom and discharging hydraulic fluid thereto, said direction control valve having a rotor rotatable alternately in opposite directions for controlling supplying of pressurized hydraulic fluid to said hydraulic power cylinder and simultaneously discharging of hydraulic fluid alternately through said ports for effecting reciprocating of the piston rod alternately in opposite directions of travel in dependence upon a corresponding direction of rotation of the direction control valve rotor, a drum rotatable alternately in opposite directions coupled to said direction control valve for rotating the rotor thereof alternately in opposite directions corresponding to the alternate directions of rotation of said drum for controlling the direction of travel of the piston rod in dependence upon the direction of rotation of the direction control valve rotor, another rotatable drum remote from the first-mentioned drum and having a manually rotatable steering device coupled thereto for manually effecting rotation thereof alternately in opposite directions of rotation for rotating the first-mentioned drum alternately in opposite directions of rotation thereof for controlling the direction of travel of said piston rod, a pair of flexible cables between the drums and wound thereon for coupling the drums for effecting control of directional travel of the piston rod by the steering device, and links connected on receptive opposite ends of the piston rod and traveling therewith for connection to respective devices to be actuated thereby.

2. A power steering device for automobiles and similar vehicles comprising:

a hydraulic power cylinder having a piston and piston rod thereof reciprocably driven by pressurized hydraulic fluid supplied to the power cylinder alternately on opposite sides of the piston while hydraulic fluid is simultaneously discharged from the power cylinder from a side of the piston opposite to the side to which pressurized hydraulic fluid is being supplied, said hydraulic power cylinder having a pair of ports for alternately supplying the pressurized hydraulic fluid through one of the ports while discharging hydraulic fluid through the other of said ports for reciprocating the piston and piston rod alternately in opposite directions of travel, a rotary direction control valve having ports in communication with said hydraulic power cylinder ports and having other ports for establishing communication with a source of pressurized hydraulic fluid for receiving pressurized hydraulic fluid thereform and discharging hydraulic fluid thereto, said direction control valve having a control rotor rotatable alternately in opposite directions for controlling supply of pressurized hydraulic fluid to said hydraulic power cylinder and simultaneously discharging of hydraulic fluid alternately through said ports for effectively reciprocating the piston rod alternately in opposite directions of travel in dependence upon a corresponding direction of rotation of the direction control valve rotor, a drum rotatable alternately in opposite directions coupled to said direction control valve for rotating the control rotor thereof alternately in opposite directions corresponding to the alternate directions of rotation of said drum for controlling the direction of travel of the piston rod in dependence upon the direction of rotation of the direction control valve rotor, another rotatable drum remote from the first-mentioned drum and having a manually rotatable steering wheel coupled thereto for manually effecting rotation thereof alternately in opposite directions of rotation for rotating the first-mentioned drum alternately in opposite directions of rotation thereof for controlling the direction of travel of said piston rod, a pair of flexible cables between the drums and wound thereon for coupling the drums for effecting control of directional travel of the piston rod by the steering device, and links connected on receptive opposite ends of the piston rod for traveling therewith connected to respective steering wheels of the vehicle to be steered thereby.

3. A power steering device according to claim 2, in which said piston rod has a rack thereon, a pinion on said rotor and rotatable therewith, said pinion disposed engaging said rack for driving the piston rod in the direction of travel corresponding to the direction of travel by said piston rod effected by said pressurized fluid, whereby said hydraulic power cylinder assists in steering of the vehicle.

4. A power steering according to claim 3, including means for adjusting the length of said cables individually to adjust the lenth thereof between said drums and eliminating play therebetween.

5. A power steering devicecolumn according to claim 2, in which said cables are swaged to reduce possible elongation thereof.

\* \* \* \* \*